US011063909B1

(12) United States Patent
Moore et al.

(10) Patent No.: US 11,063,909 B1
(45) Date of Patent: *Jul. 13, 2021

(54) METHODS AND SYSTEMS FOR EFFICIENT CYBER PROTECTIONS OF MOBILE DEVICES

(71) Applicant: Centripetal Networks, Inc., Portsmouth, NH (US)

(72) Inventors: Sean Moore, Hollis, NH (US); Peter P. Geremia, Portsmouth, NH (US)

(73) Assignee: Centripetal Networks, Inc., Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/194,886

(22) Filed: Mar. 8, 2021

Related U.S. Application Data

(63) Continuation of application No. 16/897,942, filed on Jun. 10, 2020, now Pat. No. 10,944,721, which is a
(Continued)

(51) Int. Cl.
*H04L 29/06* (2006.01)
*H04L 12/66* (2006.01)
*H04L 12/46* (2006.01)

(52) U.S. Cl.
CPC ...... *H04L 63/0245* (2013.01); *H04L 12/4633* (2013.01); *H04L 12/66* (2013.01); *H04L 63/0263* (2013.01)

(58) Field of Classification Search
CPC ..... H04L 12/28; H04L 29/06; H04L 63/0245; H04L 12/4633; H04L 12/66; H04L 63/0263; H04L 12/56; H04W 72/04; H04W 24/02; G06N 5/02; G06F 12/16; G06F 15/173; G06F 17/00; G06F 15/16;
(Continued)

(56) References Cited

U.S. PATENT DOCUMENTS 7,444,515 B2 10/2008 Dharmapurikar et al.
7,823,195 B1 10/2010 Xie et al.
(Continued)

OTHER PUBLICATIONS

Jul. 12, 2019 (U.S.) Non-Final Office Action—U.S. Appl. No. 16/399,700.
(Continued)

*Primary Examiner* — Thanhnga B Truong
(74) *Attorney, Agent, or Firm* — Banner & Witcoff, Ltd.

(57) ABSTRACT

Enterprise users' mobile devices typically access the Internet without being protected by the enterprise's network security policy, which exposes the enterprise network to Internet-mediated attack by malicious actors. This is because the conventional approach to protecting the mobile devices and associated enterprise network is to tunnel all of the devices' Internet communications to the enterprise network, which is very inefficient since typically only a very small percentage of Internet communications originating from an enterprise's mobile devices are communicating with Internet hosts that are associated with threats. In the present disclosure, the mobile device efficiently identifies which communications are associated with Internet threats, and tunnels only such identified traffic to the enterprise network, where actions may be taken to protect the enterprise network.

24 Claims, 6 Drawing Sheets

Related U.S. Application Data continuation of application No. 16/502,565, filed on Jul. 3, 2019, now Pat. No. 10,715,493.

(58) Field of Classification Search
CPC .......... G06F 12/14; G06F 11/00; G06F 21/56; G08B 23/00
See application file for complete search history.

(56) References Cited

U.S. PATENT DOCUMENTS

| | | | |
|---|---|---|---|
| 8,510,821 B1 | 8/2013 | Brandwine et al. | |
| 8,578,497 B2 | 11/2013 | Antonakakis et al. | |
| 8,630,294 B1 | 1/2014 | Keen et al. | |
| 8,914,845 B2 | 12/2014 | Barton et al. | |
| 8,949,371 B1 * | 2/2015 | Shrowty | G06F 21/6218 709/217 |
| 9,118,702 B2 * | 8/2015 | MaCaulay | G06F 21/552 |
| 9,171,153 B2 | 10/2015 | Jorgensen | |
| 9,622,176 B2 | 4/2017 | Sathy et al. | |
| 10,051,001 B1 | 8/2018 | Ashley et al. | |
| 2007/0240222 A1 * | 10/2007 | Tuvell | G06F 16/245 726/24 |
| 2008/0163333 A1 | 7/2008 | Kasralikar | |
| 2008/0232359 A1 * | 9/2008 | Kim | H04L 63/0236 370/389 |
| 2014/0157405 A1 | 6/2014 | Joll et al. | |
| 2015/0296505 A1 | 10/2015 | Luna et al. | |
| 2016/0248797 A1 * | 8/2016 | Yampolskiy | G06F 21/577 |
| 2017/0126740 A1 | 5/2017 | Bejarano Ardila et al. | |
| 2017/0251003 A1 * | 8/2017 | Rostami-Hesarsorkh | H04L 63/1425 |
| 2017/0302703 A1 | 10/2017 | Buruganahalli et al. | |
| 2018/0309658 A1 | 10/2018 | Parla et al. | |

OTHER PUBLICATIONS

Sep. 29, 2020—(WO) International Search Report and Written Opinion—PCT/US2020/027688.

Zhang, Menghao, et al., "Tripod: Towards a Scalable, Efficient and Resilient Cloud Gateway," IEEE Journal on Selected Areas in Communications, IEEE Service Center, vol. 37, No. 3, Mar. 1, 2019, pp. 570-585.

Nov. 15, 2019—(U.S.) Non-Final Office Action—U.S. Appl. No. 16/502,565.

Aug. 19, 2020—(U.S.) Non-Final Office Action—U.S. Appl. No. 16/897,942.

\* cited by examiner

METHODS AND SYSTEMS FOR EFFICIENT CYBER PROTECTIONS OF MOBILE DEVICES

CROSS-REFERENCE TO RELATED APPLICATIONS

This application is a continuation of U.S. patent application Ser. No. 16/897,942, filed Jun. 10, 2020, which is a continuation of co-pending U.S. patent application Ser. No. 16/502,565, filed Jul. 3, 2019, the content of which are hereby incorporated by reference into the present application.

FIELD OF USE

Aspects described herein generally relate to computer hardware, software, and network security. In particular, one or more aspects of the disclosure generally relate to computer hardware and software for efficient cyber protections of mobile devices.

BACKGROUND

Network security is becoming increasingly important as the information age continues to unfold. Network threats/attacks may take a variety of forms (e.g., unauthorized requests or data transfers, viruses, malware, large volumes of traffic designed to overwhelm resources, and the like). Many of these threats use the Internet to access and attack enterprise computer resources/assets, as follows: Immobile, or fixed, enterprise hosts such as desktop computers, on-premises or cloud enterprise applications servers, public-facing web servers, and the like, may be directly attached to private TCP/IP networks that are owned and/or operated and administrated by enterprises. These enterprise networks are in turn directly connected to the Internet so that (a) an individual enterprise's geographically distributed private networks and associated assets can access each other by using the Internet to interconnect them; (b) an individual enterprise's hosts can access other publicly addressed Internet-attached hosts (e.g., public web servers and application servers); and (c) other Internet-attached hosts can access the enterprise's public-facing hosts (e.g., e-commerce web servers). However, Internet-attached hosts may include hosts that are owned, operated, or otherwise controlled by malicious actors. These malicious actors use the Internet not only to access and attack an enterprise's public-facing hosts, but also to attack an enterprise's private resources when they are able to, for example, when they have managed to subvert the network perimeter defense structures that the enterprise uses to protect its private assets.

A conventional approach for an enterprise to protect its fixed/immobile networked assets from Internet threats is to secure its private networks at the Internet access points, also known as the enterprise network perimeter, or boundary. The enterprise defines a security policy that specifies which network traffic may be allowed to cross the boundary, in either direction (e.g. originating from hosts directly attached to, or inside, the enterprise network and destined towards Internet hosts; or conversely, originating from Internet hosts and destined towards hosts attached to the enterprise network). The security policy is enforced by various devices located at or near the Internet access points, such as network firewalls, web proxies, SSL/TLS proxies, intrusion prevention systems (IPS), intrusion detection systems (IDS) (which may be provided out-of-band), threat intelligence gateways (TIGs), and the like. This collection of devices may be called a security stack or enterprise network security stack. The effectiveness of the protections provided by the security stack may be determined by the quality, scope, and fidelity of the network security policy combined with the capabilities of the devices to efficiently enforce the policy without degrading network performance to unacceptable levels.

The conventional enterprise security stack, however, may be unable to protect an enterprise's mobile hosts/devices, such as enterprise users' personal mobile smartphones, portable tablets, and portable desktops, from Internet threats. This is because such devices may directly connect to the Internet via radio access networks such as cellular networks and Wi-Fi networks. In such scenarios, these mobile devices may communicate directly with Internet hosts but without filtering the associated network traffic through the enterprise security stack. Thus, malicious Internet hosts and actors can readily attack the mobile devices and can readily infect the mobile devices with malware or otherwise may gain control of resources and applications on the mobile devices. Furthermore, the mobile devices may serve as vehicles-of-entry for malicious actors to penetrate the enterprise network and attack the enterprise's fixed networked assets. For example, the enterprise mobile devices and/or applications that the devices host may have privileged and authorized access to enterprise application servers that are located behind the security stack. As another example, mobile users may sometimes attach their mobile devices directly to the enterprise network via a Wi-Fi access point. In both of these examples, the malicious actors may gain direct and unfettered access to enterprise network assets. The malicious actors may then leverage the mobile device's access to assets behind the security stack to attack the enterprise assets.

A conventional approach to securing an enterprise's mobile assets is to (a) configure (secure) tunnels between each enterprise mobile device and a tunnel gateway located behind the enterprise security stack; and (b) send most or all of the mobile devices' Internet communications through the tunnel. When the communications exit the tunnel gateway, the communications may be sent through the enterprise security stack. An enterprise security policy may be applied to the communications, while on their way to Internet hosts. Any responsive communications sourced by the Internet hosts may be similarly filtered through the security stack. There are multiple practical issues with this approach, however, that may cause enterprises not to use it and/or may cause mobile device users to reject it, which may result in an enterprise not effectively securing mobile devices, and therefore the enterprise networked assets, from Internet threats.

One of the most challenging issues is the inefficiency of tunneling substantially all of the mobile devices' Internet traffic back to the tunnel gateways so that the traffic can be filtered through the security stack to detect communications that may be associated with Internet threats. Typically only a very small percentage of Internet communications originating from an enterprise's mobile devices are communicating with Internet threats, and thus only this threat-associated traffic needs to be filtered. Also, as the enterprise workforce becomes increasingly mobile, and because enterprise users overwhelmingly prefer to use their own personal mobile devices (e.g., smartphones) for both personal and work/enterprise communications—a market phenomenon called "Bring your own device" or "BYOD"—much of a mobile device's Internet traffic may be personal communications (e.g. high-bandwidth videos) that (a) are not threats to the enterprise, and (b) are private communications that the user may not want to subject unnecessarily to the enterprise's security policies and corporate usage policies. Also, local privacy protection laws or regulations may factor in to whether or not the enterprise is allowed to filter these personal communications. Thus, enterprise network resources used to secure mobile device traffic may be wasted. Also, the mobile devices may waste many resources, including battery power, by unnecessarily encrypting and tunneling traffic that is legitimate and/or benign. As the next generation of cellular networks are deployed, which provide for even higher bandwidths, even more bandwidth consumption by applications, and even more resource consumption by mobile devices, it is expected that the costs and other inefficiencies of conventionally securing mobile devices' Internet traffic and associated enterprise networks will increase and may become prohibitive.

Accordingly, there is a need to efficiently secure an enterprise's mobile assets with the enterprise's network security policy and thereby protect the enterprise's networked assets from Internet threats.

SUMMARY

The following presents a simplified summary in order to provide a basic understanding of some aspects of the disclosure. It is intended neither to identify key or critical elements of the disclosure nor to delineate the scope of the disclosure. The following summary merely presents some concepts of the disclosure in a simplified form as a prelude to the description below.

Aspects of this disclosure relate to efficiently securing mobile devices and their associated enterprise networks from Internet threats. The mobile devices may identify mobile device communications traffic that may be associated with Internet threats, and may tunnel only such identified traffic to tunnel gateways for filtering by the enterprise security stack.

The identification of communications that are associated with Internet threats may leverage databases or data structures of cyber threat intelligence (CTI) that are available from many CTI provider organizations. This CTI may include indicators, or threat indicators, or Indicators-of-Compromise (IoCs). The CTI may include Internet network addresses—in the form of IP addresses, IP address ranges, L4 ports and associated L3 protocol types, domain names, URIs, and the like—of resources that may be controlled/operated by threat actors, or that may have otherwise been associated with malicious activity. The CTI indicators/threat indicators may also include identifiers for certificates and associated certificate authorities that are used to secure some TCP/IP communications (e.g., X.509 certificates used by the TLS protocol to secure HTTP-mediated sessions).

To determine if an active communication may be associated with an Internet threat, the in-transit packets composing the communication may be compared to the database of or data structure filled with threat indicators by, for example, a packet filtering device that applies packet filtering rules generated from the database of or data structure filled with of threat indicators. If a match is determined between a value for a packet and a threat indicator in the database or data structure, then at least one of a set of protective actions, or packet transformation functions (PTFs), may be applied to the packet. Those protective actions/PTFs may include dropping a packet, allowing a packet to continue to its intended destination, monitor a packet (which may include logging and capturing the packet or logging and forwarding the packet), mirroring a packet to its intended destination and to another network device for monitoring or testing, redirecting a packet, generating a corresponding response packet, or the like.

The protective actions/PTFs may be determined in part by the threat intelligence data or threat metadata provided by the associated CTIP that supplied the indicator. The CTIPs may associate their CTI indicators with a threat risk value that is non-binary. For example, an indicator's risk may be represented as or associated with a probability or likelihood that an associated packet or communications is part of an attack. Such threat risk values may be factored in to the determination of the protective action/PTF that may be applied to the matching packet. For example, if there is nearly 100% threat risk associated with a packet, the packet may be dropped because it is very likely to be part of an attack. The packet may also be logged, captured, and alerted to authorities, who should be made aware of the threat/attack. Conversely, if there is nearly 0% threat risk associated with a packet, the packet may be allowed to proceed towards its destination because it is unlikely to be part of an attack. As another example, if a packet's risk likelihood is 50%, then the packet may be allowed to continue to its intended destination, but the packet may also be logged, captured, or the risk may be identified in an alert to designated authorities, who may further analyze the packet and associated communication to determine whether or not the packet/communication was part of an attack. Estimating risk values and selecting associated actions/PTFs, or network protective actions, may be a function of several variables, including threat metadata (e.g., attack type, attack attribution, and the like) which may be provided by the associated CTIP, the number of CTIPs that supplied the same indicator, which CTIP(s) supplied the indicator, the fidelity of the indicator, the geographical location of the originator of the packet, the preferences of the administrators of the associated network being protected, and the like.

A policy creation and management system (a) may receive CTI and associated metadata from one or more CTIPs; (b) may aggregate the threat indicators (e.g., merge and remove duplicate information); (c) may create a packet filtering rule for each threat indicator; (d) may collect all of the packet filtering rules into a policy; and (e) may distribute the policy to subscribing policy enforcement devices such as network firewalls and threat intelligence gateways (TIGs). In step (c) when creating packet filtering rules, each rule may specify (1) packet matching criteria, e.g., pairs of packet fields and values, where the values are CTI indicators; and (2) a packet disposition, or network protective action, or PTF, to be applied to a packet that matches the rule's criteria. The packet filtering rule's syntax may be specified by the policy enforcement device. The syntax may be the same as or similar to syntaxes for commercial firewalls such as BSD PF or iptables. The packet dispositions/actions/PTFs may be specified by policy creation logic that, as described above, may factor in CTIP-supplied threat metadata, administrator preferences, and the like. The policy creation and management system may in integrated into a mobile application. The mobile application may also be configured to install and receive updates for a policy generated from a centralized server.

The size of CTI-derived policies may factor into the disclosed methods and systems. To provide the most effective network protections, the CTI from many different independent CTIPs should be used to derive the policies. As CTIPs may differentiate themselves by, for example, attack types, market segments, threat metadata quality, indicator types, and fidelity, there may be very little overlap between the indicators supplied by independent CTIPs. For two sets of threat indicators supplied by any two independent CTIPs, the intersection of the sets may be relatively small or even null. Thus, to have the best chance of observing an active threat communication, CTI available from as many independent CTIPs as practical should be used to derive policies. This may result in very large policies. For example, a size of a CTI-derived policy created from many independent CTIPs may be five (5) million packet-filtering rules. However, the scope of Internet threats continues to grow quickly, and accordingly CTIPs continue to produce more CTI. Thus, for future proofing, filtering systems may be designed to handle an order-of-magnitude increase in the size of effective CTI-derived policies, to include in the range of 10-50 million packet filtering rules.

The dynamics of CTI-derived policies may also factor into the described methods and systems. CTI continually changes because, for example, malicious actors are continually and rapidly creating new attacks with new threat indicators. Threat indicators may also "age out" after 60-180 days and are no longer considered risky. Also, CTIPs may differentiate by the frequency of their CTI updates. Accordingly, CTI-derived policies must be updated frequently in order to maintain effectiveness. In practice, CTI-derived policy distribution frequencies may be weekly, daily, or hourly.

The characterization of each rule in a policy by an indicator in the rule's matching criteria may also factor into the disclosed methods and systems. This property may be exploited by tests to determine if packet data will match any rule in the policy before searching the policy.

Due to the size and dynamics of CTI databases, the use of CTI to protect networks may benefit from automation for both policy creation and policy enforcement. For policy enforcement automation, any network device that may apply packet filtering rules to in-transit network traffic, such as a network firewall, may potentially perform the policy enforcement function. To apply CTI to protect networks, it is beneficial for a policy enforcement device to be capable of: (a) applying very large policies composed of millions of packet filtering rules to in-transit network traffic on high-speed Internet access links (e.g. 10G) without significant latency or packet loss (e.g. due to buffer overflows caused by large latency); (b) applying packet filtering rules with different types of indicators in their matching criteria, for example, IP addresses, IP address ranges, 5-tuples, domain names, URIs, X.509 certificates, and the like; (c) quickly and frequently updating the currently enforced very large policy with a new very large policy without loss of packet forwarding service or loss of security/protections; and (d) logging and capturing packets so that, for example, the communications may be cyber analyzed using, for example, security information and event management (STEM) applications and packet analyzer applications.

One potential approach to protecting mobile devices and associated networks with CTI-derived policies is to locate the policy enforcement function on the endpoint mobile device. Mobile device operating systems such as Android include a network firewall capability (e.g. iptables in Android) that can apply CTI-derived packet filtering rules to traffic originated by and received by the endpoint mobile device. But while iptables, as well as conventional network firewalls and so-called "next-gen" firewalls, may be identified with the CTI-derived policy enforcement function when they are configured with CTI-derived rules, such firewalls typically do not have all of the above capabilities of a network gateway. In addition, conventional mobile devices generally lack sufficient processor and memory requirements to support the capabilities of a network gateway. Also, mobile devices typically minimize processing load and therefore power consumption in order to conserve the power stored in their batteries. Thus, this potential approach of locating an effective policy enforcement function on the mobile device may be impractical.

To address the issues with the limited processing capability and battery power conservation of mobile devices, the policy enforcement function (e.g. a TIG) with the security stack may be provided at the enterprise network's Internet access points; and, instead of tunneling all of the Internet traffic from each mobile device to a tunnel gateway located behind the security stack, the system may tunnel from each mobile device only the Internet traffic that may match a packet filtering rule in the CTI-derived policy enforced by the TIG. The system may locally execute logic, on each mobile device, that efficiently determines which Internet traffic packets will match a packet filtering rule in the policy enforced by the (remote) TIG located in the enterprise network.

To efficiently determine which Internet traffic packets will match a packet filtering rule in the policy, each rule in a CTI-derived policy may be characterized by a threat indicator. The threat indicator may be used as a filtering rule's matching criteria. A mobile device may utilize a data structure that represents each rule in a security policy by its characterizing threat indicator to determine if an Internet traffic packet will match a rule in the policy. To represent an entire policy, the system may collect all of the indicators— IP addresses, domain names, URIs, certificate IDs, etc.— that characterize each rule in the policy and insert each such indicator into, for example, a set data structure that may be tested to determine if an element (e.g. an IP address, domain name, URI, certificate ID, etc.) is a member of the set. The data structure may be generated by a policy management server, may be distributed to each mobile device, and may be stored on each mobile device that may be protected by the policy. When the mobile device originates or receives an Internet traffic packet, computer logic and/or an application on the mobile device may extract any elements contained in the packet that may correspond to threat indicators in the data structure, such as an IP address, domain name, URI, certificate ID, etc., and may test the data structure to determine if any such element is a member of the set of the data structure. If the test indicates that any packet element is a member of the set of threat indicators, then the packet, or a copy of the packet, may be tunneled to the tunnel gateway, which may be located in the enterprise private network. Upon exiting the tunnel gateway, the packet may be sent to the TIG, which may filter the packet through the policy to determine which packet filtering rule matches the packet. When the matching rule is determined by a policy test by the TIG, the action(s) or PTF(s) associated with the rule may be applied to the packet to protect the network. If the action(s) or PTF(s) cause the packet to be forwarded towards the Internet, the packet may be passed through an associated security stack.

The data structure is preferably efficient with respect to both space and time. The memory required to store the set of elements, or threat indicators, that characterize the rules in the policy, must be small relative to the available main memory on the mobile device, and a membership test function and an element insertion function must be fast and efficient in both theory and in practice. As described in U.S. patent application Ser. No. 16/399,700, filed on Apr. 30, 2019, and which is incorporated herein by reference, a probabilistic data structure called a Bloom filter may satisfy these criteria. A Bloom filter space-efficiently stores the elements of a set, time-efficiently inserts elements into the set, and may be time-efficiently tested to determine if an element may be a member of a set. Bloom filters are parameterized by a false positive rate P, which is the probability that a set membership test for an element returns True when in fact the element is not a member of the set. For Bloom filters, the false negative rate is zero. That is, if a set membership test for an element returns False, then it is certain that the element is not a member of the set.

A Bloom filter may be used by the mobile device to efficiently determine if a packet element, such as an IP address, domain name, or URI extracted from an Internet traffic packet, is a member of the set of all indicators that characterize the rules in the policy. For example, a Bloom filter of size approximately 9 MBytes may be sufficient to store all of the IP address, domain name, and URL indicators in a real-world policy composed of approximately five (5) million packet filtering rules derived from a similar number (e.g. 5 million) of CTIP-supplied threat indicators, when the false positive rate $P=10^{-3}$, or one in a thousand. A Bloom filter containing 5 million elements may be quickly tested to determine (e.g. typically in less than 1 microsecond) if a given packet element (e.g. IP address, domain name, or URL) is a member. For this or any Bloom filter, space/memory and membership test time requirements vary with the magnitude of the logarithm of P; thus, for example, decreasing $P=10^{-3}$ by a factor of one thousand to $P=10'$, or one in a million only causes space and time requirements to increase by a factor of 2 (e.g., to approximately 18 MB for this example). Many current mobile smartphones may have 1-4 GB of main memory; thus, an exemplary 9 MB Bloom filter may occupy less than 1% of main memory. If the CTI-derived policy increases significantly in size, as measured by the number of packet filtering rules or threat indicators it contains, such that the size of the associated Bloom filter becomes a concern, then the false positive rate may be increased in order to reduce the size of the Bloom filter.

The Bloom filter data structure, which may be abbreviated henceforth as "B/F", will be used in the description of the disclosure, but this choice is exemplary and not meant to be limiting or restrictive in any way. Any data structure with sufficient and similar time and space efficiencies for storing a set of elements, inserting elements into the set, and testing for an elements' membership in a set may be used. For example, a Cuckoo filter has similar time and space efficiencies as a Bloom filter (B/F), and also has the capability to efficiently delete, or remove, elements from the set—a capability that a standard Bloom filter does not have, although Bloom filter variants have been developed that support a delete capability. The capability to efficiently delete elements from a set may prove useful in some applications, implementations, and/or embodiments. The data structure may support an Insert( ) function for adding an element to the set, may support a Boolean-valued Member( ) function for testing set membership of an element, and may support a Delete( ) function for removing an element from a set. The data structure may be probabilistic, and may be associated with a non-zero false positive rate P.

If the test indicates that any packet element is a member of the set, the packet is determined to have an association with an Internet threat. As such, a threat associated packet may be tunneled from the mobile device to an enterprise network tunnel gateway, which may be located behind the security stack of the associated enterprise network. There are various tunneling technologies and associated methods that may be used, and in some scenarios the tunneling technologies and methods may depend in part on the types of protections and the amount of efficiencies that the enterprise wants for its mobile infrastructure. Some exemplary tunneling technologies are used in the detailed descriptions below; however, these tunneling technologies are exemplary and not meant to be restrictive or limiting in any way. Other tunneling technologies and methods may be used to realize the invention without departing from the scope of the disclosure.

The exemplary Internet layer/L3 tunneling protocol used in this disclosure description is IPsec tunnel mode (RFC 1431). IPsec tunnel mode may encrypt the packet traffic to be tunneled, may place the encrypted traffic in the payload section of transport layer/L4 packets (either UDP or TCP protocol), and may encapsulate the L4 packets in IP packets in which the IP address fields values are the IP addresses of the tunnel's terminals, which may include the addresses of the mobile device and the enterprise network gateway. Other Internet layer/L3 tunneling protocols may be used, including IP-in-IP (RFC 1203). The mobile devices and the tunneled traffic may be associated with a VPN, so that the associated enterprise network's private addressing scheme may be used to route and/or switch tunneled traffic through the enterprise private network to the TIG, security stack, and Internet. One exemplary way to do this is to use the L2TP protocol combined with IPsec, known as L2TP-over-IPsec, or L2TP/IPsec. L2TP/IPsec is natively supported by both Android and iOS, which are two popular mobile device operating systems. In the description below, the precise details of the protocols may be omitted when referring to tunneling. Those skilled in the art may use the context of the particular scenario to infer the details.

The mobile devices may be situationally associated with an enterprise. That is, the devices may be said to be operating in "enterprise mode" or in "personal mode", or both, depending on the properties of the current communications. For example, when a mobile device is tunneling Internet threat traffic to the enterprise network, then the device may be considered to be an enterprise host/endpoint asset attached to the enterprise network, and therefore operating in enterprise mode. When the mobile device is not tunneling Internet traffic but instead communicating directly with other Internet hosts/endpoints, then it is not considered to be an enterprise host/endpoint asset, and therefore operating in personal mode. The mobile device may simultaneously be operating in both modes. For example, the device may be simultaneously communicating directly with a non-threat/benign Internet host and communicating indirectly with an Internet-threat host via a tunnel. The device may be communicating directly with an Internet-threat host but tunneling a copy of the communication's packets back to the enterprise. Packets tunneled to the enterprise network or copied packets tunneled to the enterprise network may be monitored to determine or analyze network threats. Such packets may be monitored and cyber-analyzed to determine if the communication is an attack or a legitimate/benign communication.

The process may include configuring at least one mobile device with logic or an application to perform a test of the policy. The logic or application may be installed from an enterprise management server. The mobile device may include a cellular phone, a tablet, laptop computer, or a mobile networking device, such as a mobile hotspot. The enterprise network may be configured with a TIG and a tunnel gateway.

A policy creation and distribution management server may receive CTI from multiple CTIPs and may create a CTI-derived policy that may include a plurality of rules. The management server may create a Bloom filter B/F based on a set of elements that represents each of the plurality of rules. Such a data structure, hereinafter called TUNNEL-B/F, may contain the threat indicators extracted from each rule in the policy. The system may download the policy to the TIG, and may transmit the data structure TUNNEL-B/F to each mobile device associated with the enterprise network and to other network elements, including the TIG.

A mobile device may initiate communication with an Internet host. The outbound packet's values, such as IP addresses, domain names, and URIs, may be tested for membership in the data structure TUNNEL-B/F. If a membership test returns True, the system may tunnel the packet to the enterprise network. The packets may be filtered through the TIG and security stack. Each of the subsequent packets in the communication flow may be tunneled to the enterprise network, and may be filtered through the TIG and security stack. If a membership test returns False, the system may forward the packet directly towards the Internet host, without tunneling the packet to the enterprise network.

Upon receipt of a tunneled packet exiting from the tunnel gateway, the enterprise network may forward packets towards the TIG. The TIG may apply the policy to each packet. When the TIG finds the matching packet filtering rule, the TIG may apply the rule's corresponding action(s)/PTF(s) to the packet. An action/PTF may, for example, drop the packet or may forward the packet to the security stack for additional security processing. An action/PTF may cause a packet to be logged and captured so that the packet and associated communication can be analyzed with a SIEM application and/or a packet analyzer application to determine if the communication is a threat or attack, or if the communication is determined to be benign.

There are many possible variants to the above process, some of which are detailed below in the Detailed Description section.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the disclosure. In addition, reference is made to particular applications, protocols, and embodiments in which aspects of the disclosure may be practiced. It is to be understood that other applications, protocols, and embodiments may be utilized, and structural and functional modifications may be made, without departing from the scope of the disclosure.

Various connections between elements are discussed in the following description. These connections are general and, unless specified otherwise, may be direct or indirect, wired or wireless, physical or logical (virtual/software-defined). Similarly, the network elements, such as hosts and appliances, may be physical or virtual. In this respect, the specification is not intended to be limiting.

Figure 1:
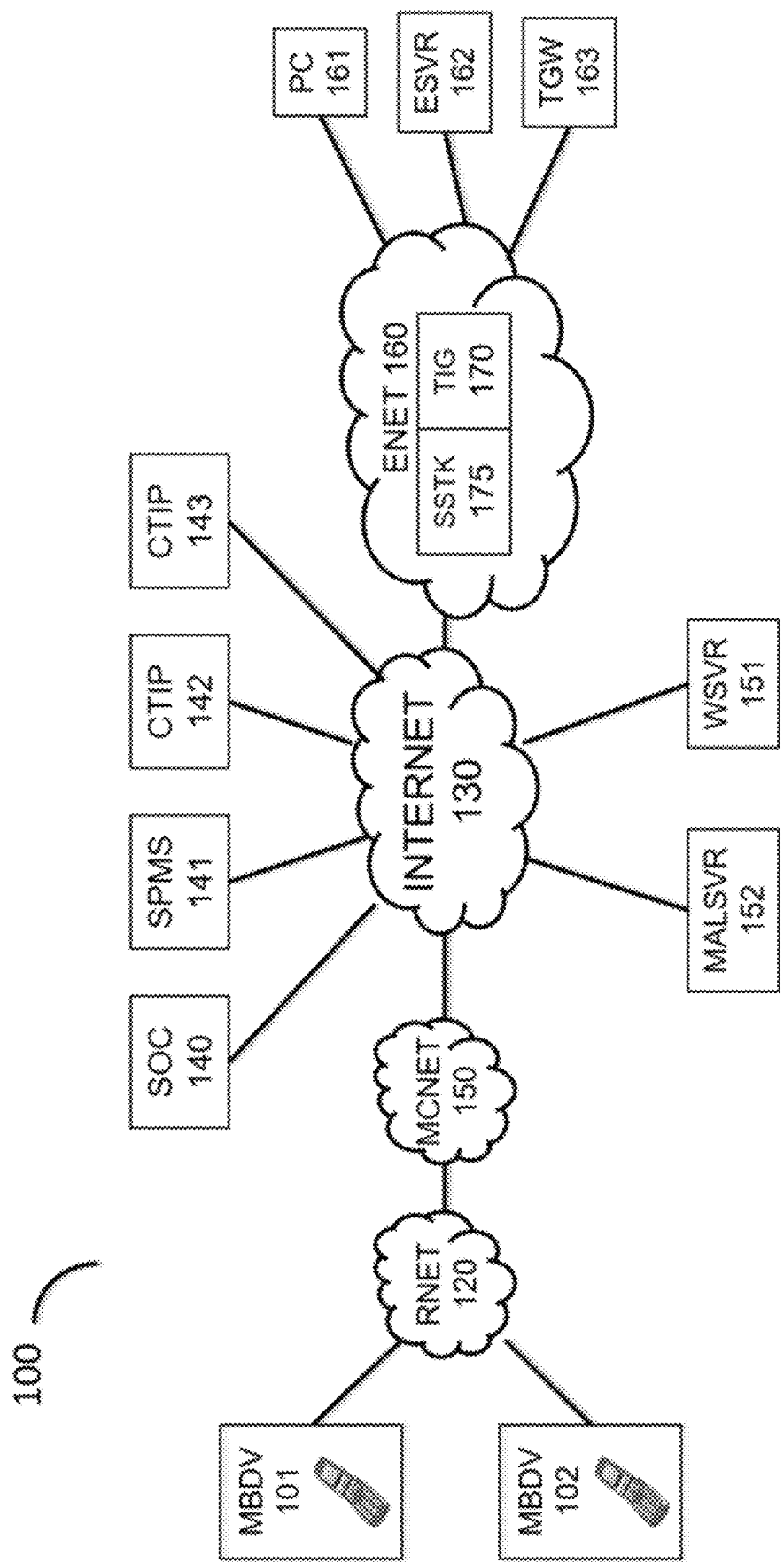
FIG. 1 depicts an illustrative environment for a protection system for mobile devices and associated enterprise networks.

In accordance with embodiments of the disclosure, and referring to FIG. 1, which shows a representative environment 100 of the invention, consider a system for efficient cyber protections of mobile devices and associated enterprise networks. The mobile devices MBDV 101 and MBDV 102 are personally owned/operated by users that may be affiliated with the enterprise that operates the private enterprise network ENET 160. The mobile devices MBDV 101 and MBDV 102 both subscribe to the mobile provider that operates the radio access network RNET 120 and the mobile core network MCNET 150. When the mobile devices MBDV 101 and MBDV 102 make cellular phone calls the signaling and communications are routed through the mobile core network MCNET 150 and may be routed through the mobile core networks of other mobile providers (not shown in FIG. 1). 2G and later-generation mobile devices and mobile networks support access to the Internet and associated TCP/IP networks. The mobile devices MBDV 101 and MBDV 102 may access publicly addressed Internet servers such as web server WSVR 151 and malware server MALSVR 152 via the Internet 130. The mobile device MBDV 101 may download and may install a mobile device security application MBL-CYBER-APP that implements the functions of the packet testing, packet filtering, and packet tunneling described herein. The mobile device security application MBL-CYBER-APP may configure, tunnel client (s), manage TUNNEL-B/F, and perform other functions as described elsewhere in this disclosure specification. The mobile device MBDV 102 has not downloaded the mobile device security application MBL-CYBER-APP and therefore is not protected by the methods and systems of this disclosure.

Private enterprise network ENET 160 may provide Internet access to internal hosts such as PC 161. Private enterprise network ENET 160 may be configured such that traffic between these internal hosts and Internet hosts must pass through threat intelligence gateway TIG 170, which may be enforcing a CTI-derived policy. Traffic may also pass through security stack SSTK 175, which may include at least one of a conventional network firewall and other enterprise network security devices such as a web proxy, SSL proxy, IDS, IPS, and the like. The threat intelligence gateway TIG 170 and security stack SSTK 175 may be located at or near the Internet access point for private enterprise network ENET 160. When applying policy to packets, threat intelligence gateway TIG 170 may produce logs of the packets that match rules in the policy, which may be sent via the Internet to a security operations center SOC 140 for attack analysis by cyberanalysts using, for example, SIEM applications and packet analyzer applications.

An enterprise system server ESVR 162 may be a private web application server hosted by the enterprise for use by the enterprise's users, which may include the users that own/operate the mobile devices MBDV 101 and MBDV 102. The mobile devices MBDV 101 and MBDV 102 access the enterprise system server ESVR 162 using an application provided by the enterprise that includes an HTTPS client for accessing the enterprise system server ESVR 162 on port 443 (the port for HTTPS). When an application connects to the enterprise system server ESVR 162, the web application presents a login form. Users may then enter their enterprise credentials to securely access the web application. Network security administrators have opened port 443 of the network firewall in security stack SSTK 175 so that unsolicited inbound HTTPS connections, such as those originating from the applications on the mobile devices MBDV 101 and MBDV 102, can initiate sessions with the enterprise system server ESVR 162.

The host tunnel gateway TGW 163 attached to private enterprise network ENET 160 terminates and concentrates tunnels that may be established with mobile devices such as the mobile device MBDV 101 that have installed the mobile device security application MBL-CYBER-APP. Similar to the enterprise system server ESVR 162, network administrators have opened one or more ports of the network firewall in security stack SSTK 175 so that unsolicited inbound tunnel traffic, such as that originating from the mobile device MBDV 101 and other mobile endpoints that have installed the mobile device security application MBL-CYBER-APP, may access TGW 163. For example, if the tunneling protocol is IPsec tunnel mode, then the administrators may have opened the IPsec well-known ports 500, 50, and 51. TGW 163 may decapsulate and/or may decrypt received packets upon egress from the tunnel. The TGW 163 may forward the decapsulated and/or decrypted packets into the private enterprise network ENET 160. Since these packets will have public Internet addresses in the destination IP address field of their IP headers, the routers and/or switches in private enterprise network ENET 160 may forward these packets towards the Internet access point, and therefore towards the threat intelligence gateway TIG 170, which applies a CTI-derived policy to the packets.

The security policy creation and management server SPMS 141 may collect CTI from one or more CTIPs including, for example, CTIP 142 and 143. The security policy creation and management server SPMS 141 may also aggregate the CTI, may create at least one security policy based on the CTI, and may publish the security policies to subscribers, which may include a plurality of network devices such as host computers and a threat intelligence gateway TIG 170. The security policy creation and management server SPMS 141 may create a data structure TUNNEL-B/F for each security policy and may publish the data structure TUNNEL-B/F to each subscriber associated with each security policy, such as the mobile device security application MBL-CYBER-APP hosted by mobile device MBDV 101. Alternatively, the threat intelligence gateway TIG 170 may create a data structure TUNNEL-B/F for each associated mobile device, such as an associated instance of the mobile device security application MBL-CYBER-APP, that has been associated with threat intelligence gateway TIG 170 for cyber protections, and may publish a current data structure TUNNEL-B/F to the associated mobile device, including each subscribing instance of the mobile device security application MBL-CYBER-APP.

Figure 2:
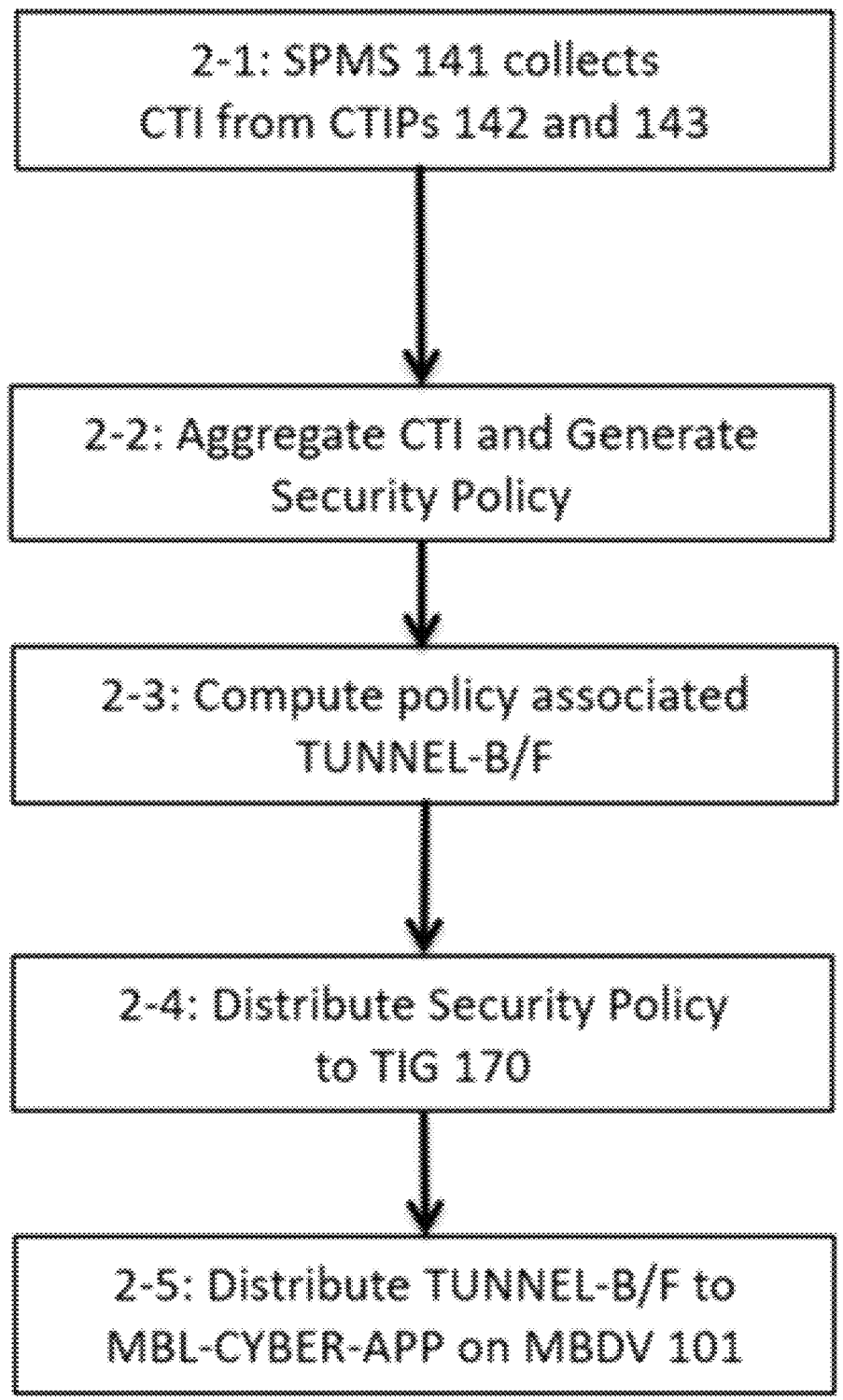
FIG. 2 depicts a flowchart for an operational concept for a security policy creation and management server for configuring mobile devices and associated enterprise network elements.

FIG. 2 depicts a flowchart for an operational concept for a security policy creation and management server for configuring mobile devices and associated enterprise network elements, for a protection system for mobile devices and associated enterprise networks depicted in FIG. 1.

In Step 2-1, the security policy creation and management server SPMS 141 may download the CTI published by threat intelligence providers, such as CTIP 142 and CTIP 143. In Step 2-2, the security policy creation and management server SPMS 141 may aggregate the CTI indicators and may process the CTI to generate a security policy. As multiple threat intelligence providers may provide the same threat indicators, the security policy creation and management server SPMS 141 may merge the rules into a single set, and may remove duplicate threat indicators and otherwise consolidate the threat indicators. The security policy creation and management server SPMS 141 may create at least one packet filtering rule, with each rule including matching criteria corresponding to the threat indicators and corresponding actions/PTF to be applied to a packet when the a match is determined. The corresponding actions/PTF may be determined based on multiple factors including requirements provided by the operators/administrators of threat intelligence gateway TIG 170. The security policy creation and management server SPMS 141 may collect each of the generated rules to generate a security policy, and may distribute the security policy to a plurality of security devices, including the threat intelligence gateway TIG 170. In Step 2-3, the security policy creation and management server SPMS 141 may generate a Bloom filter TUNNEL-B/F associated with a security policy by collecting all of the threat indicators, including IP addresses, domain names, URIs, certificate IDs, etc., that characterize each packet filtering rule in a security policy. The security policy creation and management server SPMS 141 may insert the indicators into the data structure TUNNEL-B/F, which may be tested to determine if any rule in the security policy would match the packet elements being tested.

In Step 2-4, the SPMS may publish at least one of the security policy and the data structure TUNNEL-B/F to a plurality of network security devices. The security policy creation and management server SPMS 141 may transmit at least one of the security policy and the data structure TUNNEL-B/F to a plurality of network subscribers, which may include the threat intelligence gateway TIG 170 and a plurality of mobile devices associated with the enterprise network. The threat intelligence gateway TIG 170 may download the security policy and may configure packet filtering logic with the security policy. In Step 2-5, the mobile device security application MBL-CYBER-APP on the mobile device MBDV 101 may download data structure TUNNEL-B/F and may configure tunneling logic with data structure TUNNEL-B/F. If a mobile device MBDV 102 has not installed the mobile device security application, MBL-CYBER-APP it does not download data structure TUNNEL-B/F, and is not protected by security policy. The policy and the data structure TUNNEL-B/F may also be updated, and updates to the security policy and data structure TUNNEL-B/F may be generated and distributed. Based on such updates, the mobile device security application MBL-CY-BER-APP may tunnel a packet for filtering that would previously have been allowed to proceed to its intended destination without being tunneled to the enterprise network.

Figure 3:
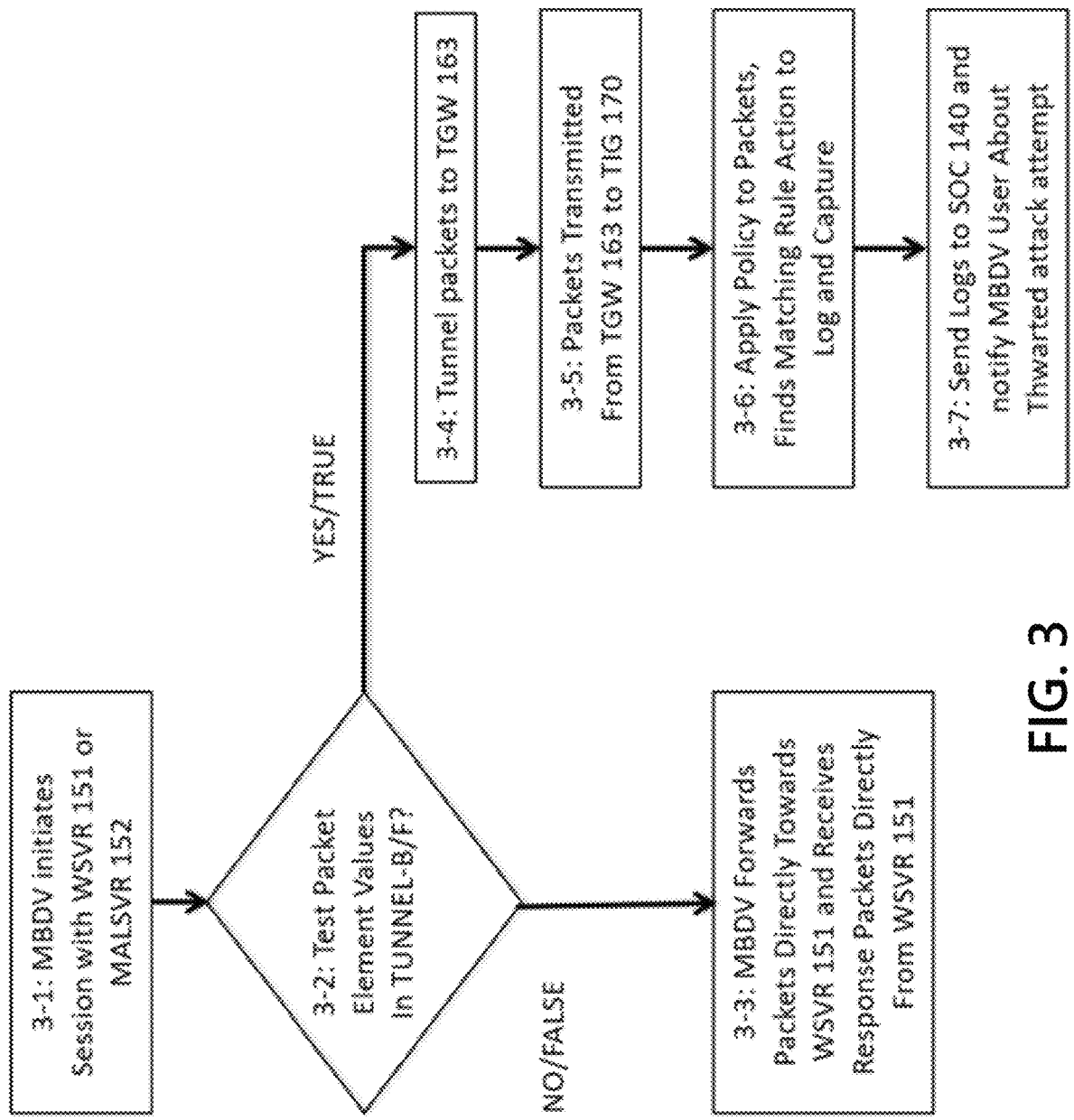
FIG. 3 depicts a flowchart for an operational concept for a packet filtering in mobile devices and associated enterprise networks.

FIG. 3 depicts a flowchart for an operational concept for packet filtering in mobile devices and associated enterprise networks, for a protection system for mobile devices and associated enterprise networks depicted in FIG. 1. The flowchart/operational concept assumes that all devices and hosts have already been configured for operation. In particular, the mobile device MBDV 101 has already downloaded, installed and configured the mobile device security application MBL-CYBER-APP, and may have established a tunnel with TGW 163. Conversely, the mobile device MBDV 102 has not been configured with the mobile device security application MBL-CYBER-APP.

In Step 3-1, a user that may own and/or operate mobile device MBDV, which may be either MBDV 101 or MBDV 102, may check e-mail via an e-mail application and may click on an embedded URL that links to a resource on web server WSVR 151. The mobile device MBDV 101 or 102 may resolve the host name, or fully qualified domain name (FQDN), of the URL's authority to the IP address, for example 12.34.56.78, of web server WSVR 151 by querying the DNS (not shown in FIG. 3). The mobile device MBDV may attempt to initiate a TCP connection with web server WSVR 151 on port 80 (HTTP) by creating a TCP SYN packet with destination port 80, and may encapsulate the TCP packet in an IP packet, which may be set with destination IP address field set to 12.34.56.78 and may be set with source IP address of the corresponding MBDV.

In Step 3-2, before the packet may be forwarded (into the radio access network RNET 120), the mobile device security application MBL-CYBER-APP of MBDV 101 may determine each packet element associated with threat indicators of the data structure TUNNEL-B/F. For example, the mobile device security application MBL-CYBER-APP may extract an IP address (e.g. 12.34.56.78) from the destination IP address field, and may test if 12.34.56.78 is a member of data structure TUNNEL-B/F. The membership test returns FALSE based on a determination that there is no matching packet filtering rule in security policy on threat intelligence gateway TIG 170. The mobile device security application MBL-CYBER-APP may determine that there is no threat risk associated with the tested packet data (e.g. IP address 12.34.56.78 for web server WSVR 151). The mobile device security application MBL-CYBER-APP may determine that there is no need to tunnel the packet to be filtered. The mobile device security application MBL-CYBER-APP may not forward the packet to TGW 163, to the threat intelligence gateway TIG 170, and/or to the security stack SSTK 175.

In Step 3-3, based on a determination that there is no need to tunnel the packet to be filtered, the mobile device MBDV 101 may forward the packet directly towards web server WSVR 151, via the radio access network RNET 120. Similarly, but without executing any tunneling determination/decision logic, MBDV 102 may forward the packet directly towards web server WSVR 151, via the radio access network RNET 120. The packet forwarding may initiate the TCP handshake and subsequently cause establishment of a TCP connection on port 80 of 12.34.56.78. The mobile device MBDV may issue an HTTP GET request method for the URL. Web server WSVR 151 may respond with the requested resource, the web session may be terminated, and the TCP connection may be torn down. During such a communication session, for MBDV 101, the relevant packet field values, such as IP address fields, domain name fields, URI fields, etc., of all inbound and outbound packets may be tested for membership in the data structure TUNNEL-B/F. When each packet in a communication flow is associated with a safe destination, mobile device security application MBL-CYBER-APP may determine that there is no need to tunnel the packet to be filtered as the tests of the data structure TUNNEL-B/F will always returns FALSE, so none of the packets composing the session are tunneled.

In Step 3-1, a user that may own and/or operate mobile device MBDV 101 may read a spear phishing e-mail and may be tricked into clicking on an embedded URL that links to a resource on malware server MALSVR 152, which may contain a web page that spoofs the login page for the enterprise web application on the enterprise system server ESVR 162. The mobile device MBDV 101 may resolve the host name, or fully qualified domain name (FQDN), of the URL's authority to the IP address, for example 87.65.43.21, of malware server MALSVR 152 by querying the DNS (not shown in FIG. 3). The mobile device MBDV 101 may attempt to initiate a TCP connection with malware server MALSVR 152 on port 80 (HTTP) by creating a TCP SYN packet with destination port 80, and may encapsulate the TCP packet in an IP packet with the destination IP address field set to 87.65.43.21. In Step 3-2, before the packet is forwarded by the device MBDV 101 to the radio access network RNET 120, the mobile device security application MBL-CYBER-APP may extract the packet elements (e.g. IP address 87.65.43.21 from the destination IP address field), and may test to determine if any packet element is a member of the data structure TUNNEL-B/F.

The membership test may return a TRUE value or other indication that there is a matching packet filtering rule in the security policy associated with the data structure TUNNEL-B/F. The mobile device security application MBL-CYBER-APP may determine, based on the TRUE value or other indication that there is a matching packet filtering rule in the security policy associated with the data structure TUNNEL-B/F, that the packets need to be filtered by the associated enterprise threat intelligence gateway TIG 170 and that there is some threat risk associated with a packet element (e.g. IP address 87.65.43.21 for malware server MALSVR 152). In Step 3-4, the mobile device MBDV 101, based on the TRUE value or other indication that there is a matching packet filtering rule in the security policy associated with the data structure TUNNEL-B/F, may transmit the packet in a network tunnel to TGW 163. In Step 3-5, the packet may be received at the enterprise network side of the tunnel, may be forwarded through private enterprise network ENET 160 towards the Internet access link, and may be received by the threat intelligence gateway TIG 170 for packet filtering. In Step 3-6, the threat intelligence gateway TIG 170 may apply security policy to the packet, and may determine a rule that matches a packet element (such as IP address 87.65.43.21). The network protective actions/PTFs associated with the determined rule may specify that the packet may be at least one of blocked/dropped, logged, and/or captured.

Alternatively, before transmitting any packet based on a determination of a match from a test of the data structure TUNNEL-B/F, the system may test a secondary data structure, to lower the amount of network traffic. For example, the system may test a block rule data structure, which may represent each rule of the policy that is associated with a block action or PTF. Based on the TRUE value or other indication that there is a matching packet filtering rule in the security policy associated with the block rule data structure, the mobile device security application MBL-CYBER-APP may perform a block rule action to prevent packets associated with a block rule from proceeding to their intended destination, without having to transmit such packets through the tunnel to a packet filtering device in the enterprise network. The block rule data structure may also be a Bloom filter, and the block rule data structure may be a smaller data structure than the data structure TUNNEL-B/F associated with all of the rules of the policy being enforced.

In Step 3-7, the threat intelligence gateway TIG 170 may send the log to a security operations center SOC 140, or other network device. The log may be analyzed by the security operations center SOC 140, such as by cyberanalysts using a STEM application. Based on a determination of a threat risk associated with malware server MALSVR 152 by the CTIP(s) that supplied the CTI for a threat indicator (e.g. IP address 87.65.43.21), the system may take a corrective instructional action. For example, a threat analysis device may report the incident to the user of the mobile device MBDV 101, or may recommend that the user watch a cybersecurity training video that discusses spear phishing e-mail attacks and how to avoid them. Similarly, the mobile device security application MBL-CYBER-APP may generate a log of the threat event and may send the log to a security operations center SOC 140, or other network security application(s) or device(s). The mobile device security application MBL-CYBER-APP may selectively generate logs of the threat event based on an indication that there is a matching packet filtering rule in the security policy associated with the block rule probabilistic data structure.

Figure 4:
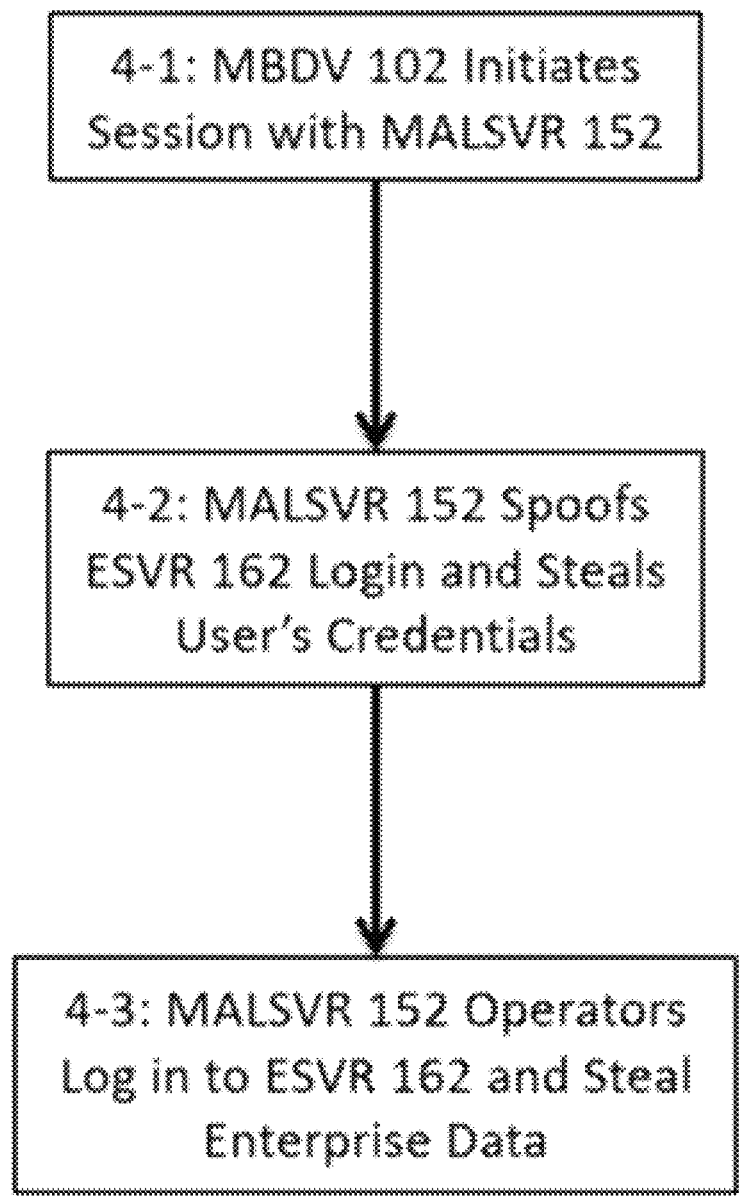
FIG. 4 depicts a flowchart for an operational concept for an unprotected system for mobile devices and associated enterprise networks.

FIG. 4 depicts a flowchart for an operational concept for packet filtering in mobile devices and associated enterprise networks, for a protection system for mobile devices and associated enterprise networks depicted in FIG. 1. The flowchart/operational concept assumes that all devices and hosts have already been configured for operation. In particular, with regards to FIG. 4, the mobile device MBDV has not downloaded, installed or configured the mobile device security application MBL-CYBER-APP.

In Step 4-1, a user that may own or operate mobile device MBDV 102, which is not configured with the mobile device security application MBL-CYBER-APP, may access a spear phishing e-mail as discussed above. However, as mobile device MBDV 102 is not configured with the mobile device security application MBL-CYBER-APP, there is no logic on the mobile device to extract packet elements and test if any packet element is a member of the data structure TUNNEL-B/F. Instead, if a user that may own or operate mobile device MBDV 102 is tricked into clicking on an embedded URL that links to a resource on malware server MALSVR 152, which may be a web page that spoofs the login page for the enterprise web application on the enterprise system server ESVR 162, the mobile device may begin to establish a connection with the malware server MALSVR 152. The mobile device MBDV 102 may resolve the host name, or fully qualified domain name (FQDN), of the URL's authority to the IP address of malware server MALSVR 152 (e.g. IP address 87.65.43.21) by querying the DNS (not shown in FIG. 4). The mobile device MBDV 102 may attempt to initiate a TCP connection with malware server MALSVR 152 on port 80 (HTTP) by creating a TCP SYN packet with destination port 80, and may encapsulate the TCP packet in an IP packet with the determined destination IP address field (e.g. IP address 87.65.43.21). Since there is no mobile device security application MBL-CYBER-APP protecting mobile device MBDV 102, the TCP connection with malware server MALSVR 152 may be established, and mobile device MBDV 102 may issue an HTTP GET request method for the URL.

In Step 4-2, malware server MALSVR 152 responds with the requested resource, which may be a web page/form that spoofs the login page for the enterprise web application on the enterprise system server ESVR 162. The user may enter the login credentials and may post the form to malware server MALSVR 152. When the user enters the login credentials, the MALSVR 152 may log and steal the login credentials. In Step 4-3, a malicious actor that may operate malware server MALSVR 152 may use the stolen credentials to log in to the enterprise system server ESVR 162 and may steal or tamper with the enterprise's sensitive data.

The functions and steps described herein may be embodied in computer-usable data or computer-executable instructions, such as in one or more program modules, executed by one or more computers or other devices to perform one or more functions described herein. Generally, program modules include routines, programs, objects, components, data structures, etc. that perform particular tasks or implement particular abstract data types when executed by one or more processors in a computer or other data-processing device. The computer-executable instructions may be stored on a computer-readable medium such as a hard disk, optical disk, removable storage media, solid-state memory, RAM, etc. As will be appreciated, the functionality of the program modules may be combined or distributed as desired. In addition, the functionality may be embodied in whole or in part in firmware or hardware equivalents, such as integrated circuits, application-specific integrated circuits (ASICs), field-programmable gate arrays (FPGA), and the like. Particular data structures may be used to more effectively implement one or more aspects of the disclosure, and such data structures are contemplated to be within the scope of computer-executable instructions and computer-usable data described herein.

Although not required, one of ordinary skill in the art will appreciate that various aspects described herein may be embodied as a method, system, apparatus, or one or more computer-readable media storing computer-executable instructions. Accordingly, aspects may take the form of an entirely hardware embodiment, an entirely software embodiment, an entirely firmware embodiment, or an embodiment combining software, hardware, and firmware aspects in any combination.

As described herein, the various methods and acts may be operative across one or more computing devices and networks. The functionality may be distributed in any manner or may be located in a single computing device (e.g., a server, client computer, or the like).

Figure 5:
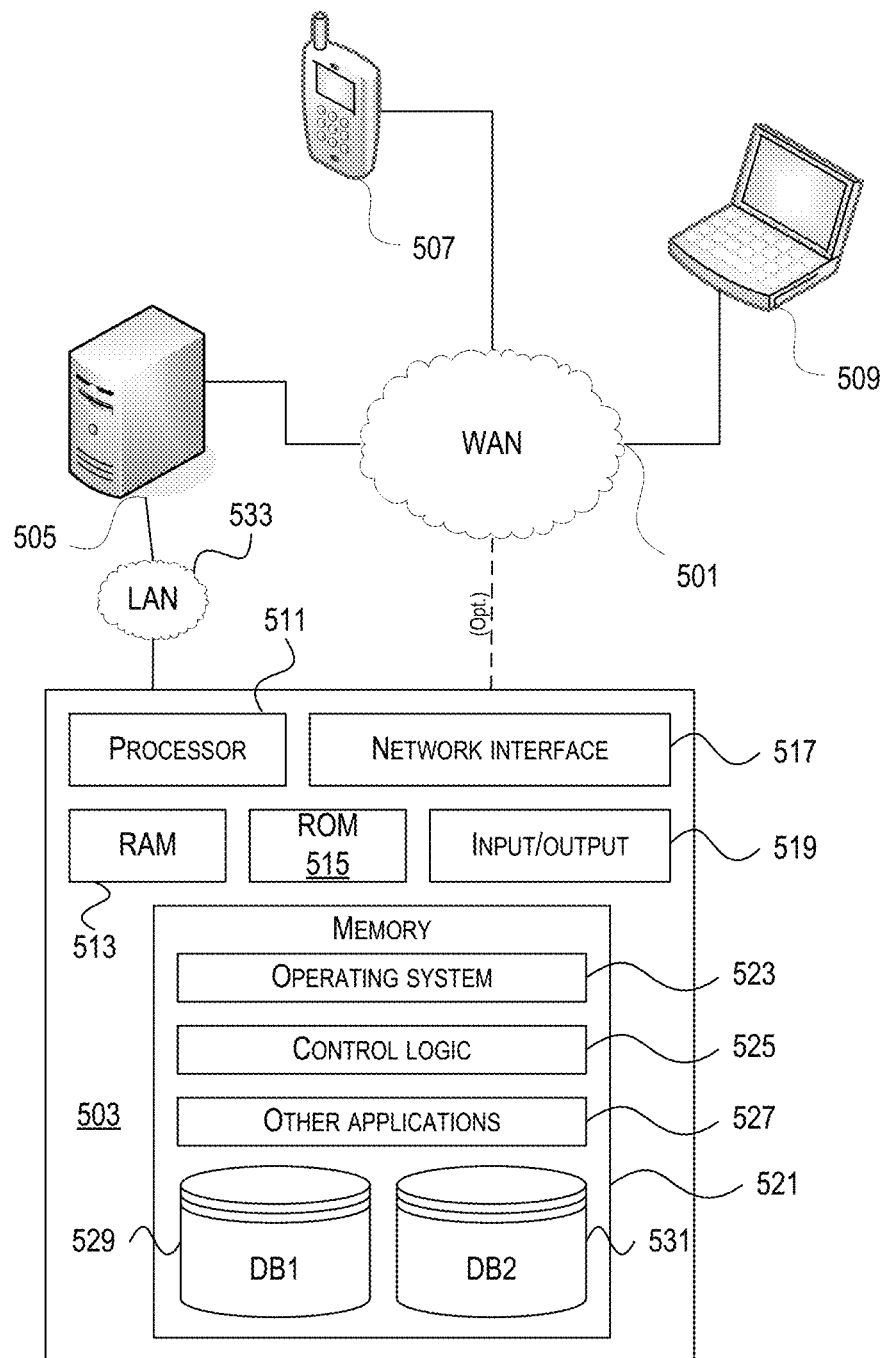
FIG. 5 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 5 illustrates one example of a system architecture and data processing device that may be used to implement one or more illustrative aspects described herein in a standalone and/or networked environment. Various network nodes 503, 505, 507, and 509 may be interconnected via a wide area network (WAN) 501, such as the Internet. Other networks may also or alternatively be used, including private intranets, corporate networks, local area networks (LAN), metropolitan area networks (MAN), wireless networks, personal networks (PAN), software-defined networks (SDN), and the like. Network 501 is for illustration purposes and may be replaced with fewer or additional computer networks. A local area network 533 may have one or more of any known LAN topology and may use one or more of a variety of different protocols, such as Ethernet. Devices 503, 505, 507, and 509 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 503, web server 505, and client computers 507, 509. Data server 503 provides overall access, control and administration of databases and control software for performing one or more illustrative aspects describe herein. Data server 503 may be connected to web server 505 through which users interact with and obtain data as requested. Alternatively, data server 503 may act as a web server itself and be directly connected to the Internet. Data server 503 may be connected to web server 505 through the local area network 533, the wide area network 501 (e.g., the Internet), via direct or indirect connection, or via some other network. Users may interact with the data server 503 using remote computers 507, 509, e.g., using a web browser to connect to the data server 503 via one or more externally exposed web sites hosted by web server 505. Client computers 507, 509 may be used in concert with data server 503 to access data stored therein, or may be used for other purposes. For example, from client device 507 a user may access web server 505 using an Internet browser, as is known in the art, or by executing a software application that communicates with web server 505 and/or data server 503 over a computer network (such as the Internet).

Servers and applications may be combined on the same physical machines, and retain separate virtual or logical addresses, or may reside on separate physical machines. FIG. 5 illustrates just one example of a network architecture that may be used, and those of skill in the art will appreciate that the specific network architecture and data processing devices used may vary, and are secondary to the functionality that they provide, as further described herein. For example, services provided by web server 505 and data server 503 may be combined on a single server.

Each component 503, 505, 507, 509 may be any type of known computer, server, or data processing device. Data server 503, e.g., may include a processor 55 controlling overall operation of the data server 503. Data server 503 may further include random access memory (RAM) 513, read only memory (ROM) 515, network interface 517, input/output interfaces 519 (e.g., keyboard, mouse, display, printer, etc.), and memory 521. Input/output (I/O) 519 may include a variety of interface units and drives for reading, writing, displaying, and/or printing data or files. Memory 521 may further store operating system software 523 for controlling overall operation of the data processing device 503, control logic 525 for instructing data server 503 to perform aspects described herein, and other application software 527 providing secondary, support, and/or other functionality which may or might not be used in conjunction with aspects described herein. The control logic may also be referred to herein as the data server software 525. Functionality of the data server software may refer to operations or decisions made automatically based on rules coded into the control logic, made manually by a user providing input into the system, and/or a combination of automatic processing based on user input (e.g., queries, data updates, etc.).

Memory 521 may also store data used in performance of one or more aspects described herein, including a first database 529 and a second database 531. In some embodiments, the first database may include the second database (e.g., as a separate table, report, etc.). That is, the information can be stored in a single database, or separated into different logical, virtual, or physical databases, depending on system design. Devices 505, 507, and 509 may have similar or different architecture as described with respect to device 503. Those of skill in the art will appreciate that the functionality of data processing device 503 (or device 505, 507, or 509) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 6:
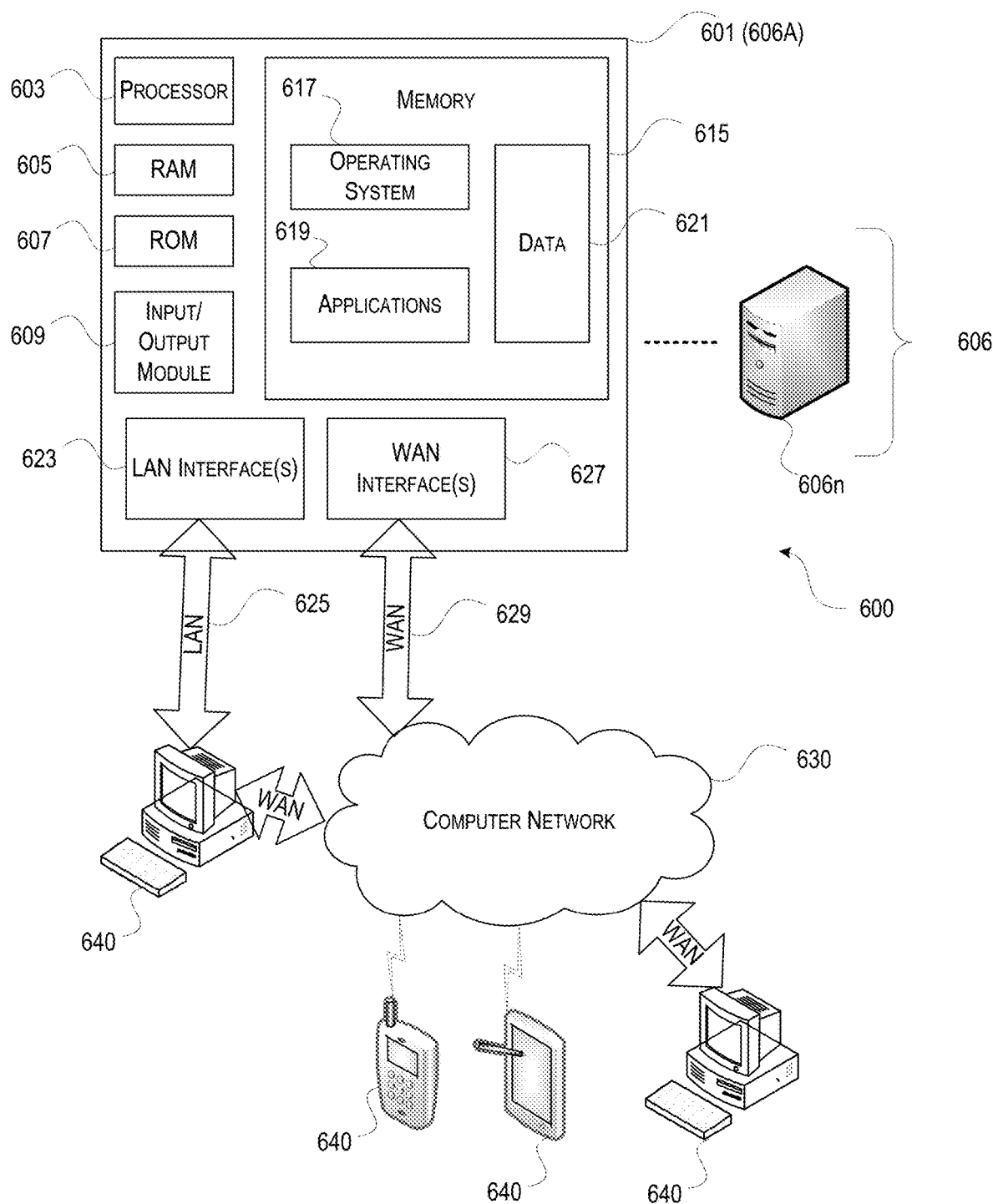
FIG. 6 depicts an illustrative remote-access system architecture that may be used in accordance with one or more illustrative aspects described herein.

With further reference to FIG. 6, one or more aspects described herein may be implemented in a remote-access environment. FIG. 6 depicts an example system architecture including a computing device 501 in an illustrative computing environment 520 that may be used according to one or more illustrative aspects described herein. Computing device 501 may be used as a server 606a in a single-server or multi-server desktop virtualization system (e.g., a remote access or cloud system) configured to provide virtual machines for client access devices. The computing device 501 may have a processor 603 for controlling overall operation of the server and its associated components, including RAM 605, ROM 607, Input/Output (I/O) module 609, and memory 615.

I/O module 609 may include a mouse, keypad, touch screen, scanner, optical reader, and/or stylus (or other input device(s)) through which a user of computing device 101 may provide input, and may also include one or more of a speaker for providing audio output and one or more of a video display device for providing textual, audiovisual, and/or graphical output. Software may be stored within memory 615 and/or other storage to provide instructions to processor 603 for configuring computing device 501 into a special purpose computing device in order to perform various functions as described herein. For example, memory 615 may store software used by the computing device 501, such as an operating system 617, application programs 619, and an associated database 621.

Computing device 501 may operate in a networked environment supporting connections to one or more remote computers, such as terminals 640 (also referred to as client devices). The terminals 640 may be personal computers, mobile devices, laptop computers, tablets, or servers that include many or all of the elements described above with respect to the computing device 503 or 501. The network connections depicted in FIG. 6 include a local area network (LAN) 625 and a wide area network (WAN) 629, but may also include other networks. When used in a LAN networking environment, computing device 501 may be connected to the LAN 625 through a network interface or adapter 623. When used in a WAN networking environment, computing device 501 may include a modem 627 or other wide area network interface for establishing communications over the WAN 629, such as computer network 630 (e.g., the Internet). It will be appreciated that the network connections shown are illustrative and other means of establishing a communications link between the computers may be used. Computing device 501 and/or terminals 640 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 6, one or more client devices 640 may be in communication with one or more servers 606a-606n (generally referred to herein as "server(s) 606"). In one embodiment, the computing environment 520 may include a network appliance installed between the server(s) 606 and client machine(s) 640. The network appliance may manage client/server connections, and in some cases can load balance client connections amongst a plurality of backend servers 606.

The client machine(s) 640 may in some embodiments be referred to as a single client machine 640 or a single group of client machines 640, while server(s) 606 may be referred to as a single server 606 or a single group of servers 606. In one embodiment a single client machine 640 communicates with more than one server 606, while in another embodiment a single server 606 communicates with more than one client machine 640. In yet another embodiment, a single client machine 640 communicates with a single server 606.

A client machine 640 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 606, in some embodiments, may be referenced by any one of the following non-exhaustive terms: server(s), local machine; remote machine; server farm(s), or host computing device(s). In some embodiments, the client machine 640 may be a virtual machine. In some aspects, the virtual machine may be managed by a hypervisor, while in other aspects the virtual machine may be managed by a hypervisor executing on a server 606 or a hypervisor executing on a client 640. The virtual machine may also be a container system managed by a container manager, for example Docker and Linux Containers (LXC). The virtual machine may also be a combination of a hypervisor-managed virtual machine and containers.

Some embodiments may include a client device 640 that displays application output generated by an application remotely executing on a server 606 or other remotely located machine. In these embodiments, the client device 640 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded. The server 606, in some embodiments, may use a remote presentation protocol or other program to send data to a thin-client or remote-display application executing on the client to present display output generated by an application executing on the server 606. The thin-client or remote-display protocol can be a protocol such as the Independent Computing Architecture (ICA) protocol developed by Citrix Systems, Inc. of Ft. Lauderdale, Fla.; or the Remote Desktop Protocol (RDP) developed by the Microsoft Corporation of Redmond, Wash.

A remote computing environment may include more than one server 606a-606n such that the servers 606a-606n are logically grouped together into a server farm 606, for example, in a cloud computing environment. The server farm 606 may include servers 606 that are geographically dispersed while and logically grouped together, or servers 606 that are located proximate to each other while logically grouped together. Geographically dispersed servers 606a-606n within a server farm 606 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 606 may be administered as a single entity, while in other embodiments the server farm 606 can include multiple server farms.

In some embodiments, a server farm may include servers 606 that execute a substantially similar type of operating system platform (e.g., WINDOWS, UNIX, LINUX, iOS, ANDROID, SYMBIAN, etc.) In other embodiments, server farm 606 may include a first group of one or more servers that execute a first type of operating system platform, and a second group of one or more servers that execute a second type of operating system platform.

Server 606 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 606a that receives requests from a client machine 640, forwards the request to a second server 606b (not shown), and responds to the request generated by the client machine 640 with a response from the second server 606b (not shown.) First server 606a may acquire an enumeration of applications available to the client machine 640 and well as address information associated with an application server 606 hosting an application identified within the enumeration of applications. First server 606a can then present a response to the client's request using a web interface, and communicate directly with the client 640 to provide the client 640 with access to an identified application. One or more clients 640 and/or one or more servers 606 may transmit data over network 630, e.g., network 501.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order and that one or more illustrated steps may be optional. Any and all features in the following claims may be combined or rearranged in any way possible.

What is claimed is:

1. A method comprising:
    receiving, by a computing device, a plurality of packet filtering rules, wherein the plurality of packet filtering rules were automatically created or altered based on malicious traffic information received from a plurality of cyber threat intelligence providers, and wherein at least two of the plurality of cyber threat intelligence providers are managed by different organizations;
    generating a policy probabilistic data structure that represents the plurality of packet filtering rules;
    sending, to a mobile device, the policy probabilistic data structure, wherein the policy probabilistic data structure causes filtering of one or more packets received by the mobile device;
    receiving, based on updated malicious traffic information received from one or more of the plurality of cyber threat intelligence providers, a new plurality of packet filtering rules;
    generating a new policy probabilistic data structure that represents the new plurality of packet filtering rules; and
    sending, to the mobile device, the new policy probabilistic data structure.

2. The method of claim 1, wherein the policy probabilistic data structure is a Bloom filter or a Cuckoo filter.

3. The method of claim 1, wherein the new policy probabilistic data structure causes the mobile device to filter a packet having a first attribute, and wherein, prior to sending the new policy probabilistic data structure, the policy probabilistic data structure was configured to cause the mobile device to allow packets having the first attribute.

4. The method of claim 1, wherein at least one of the new plurality of packet filtering rules indicates a rule action, and wherein the new policy probabilistic data structure is configured to cause the mobile device to perform the rule action on a received packet.

5. The method of claim 1, wherein the policy probabilistic data structure is configured to cause the mobile device to transmit a packet, received by the mobile device, to a threat intelligence gateway based on a first attribute of the packet, and wherein the threat intelligence gateway interfaces a boundary between:
    a first network that is protected by the threat intelligence gateway and is associated with the mobile device, and
    a second network.

6. The method of claim 1, wherein receiving the new plurality of packet filtering rules comprises:
    receiving an indication that one or more packets, received by the mobile device, were transmitted to a threat intelligence gateway that interfaces a boundary between:
        a first network that is protected by the threat intelligence gateway and is associated with the mobile device, and
        a second network.

7. The method of claim 1, wherein the policy probabilistic data structure is configured to cause logging of a packet based on a first attribute of the packet.

8. The method of claim 1, wherein the new policy probabilistic data structure comprises an updated version of the policy probabilistic data structure.

9. One or more non-transitory computer-readable media storing instructions that, when executed by one or more processors, cause a computing device to:
    receive a plurality of packet filtering rules, wherein the plurality of packet filtering rules were automatically created or altered based on malicious traffic information received from a plurality of cyber threat intelligence providers, and wherein at least two of the plurality of cyber threat intelligence providers are managed by different organizations;
    generate a policy probabilistic data structure that represents the plurality of packet filtering rules;
    send, to a mobile device, the policy probabilistic data structure, wherein the policy probabilistic data structure causes filtering of one or more packets received by the mobile device;
    receive, based on updated malicious traffic information received from one or more of the plurality of cyber threat intelligence providers, a new plurality of packet filtering rules;
    generate a new policy probabilistic data structure that represents the new plurality of packet filtering rules; and
    send, to the mobile device, the new policy probabilistic data structure.

10. The non-transitory computer-readable media of claim 9, wherein the policy probabilistic data structure is a Bloom filter or a Cuckoo filter.

11. The non-transitory computer-readable media of claim 9, wherein the new policy probabilistic data structure causes the mobile device to filter a packet having a first attribute, and wherein, prior to sending the new policy probabilistic data structure, the policy probabilistic data structure was configured to cause the mobile device to allow packets having the first attribute.

12. The non-transitory computer-readable media of claim 9, wherein at least one of the new plurality of packet filtering rules indicates a rule action, and wherein the new policy probabilistic data structure is configured to cause the mobile device to perform the rule action on a received packet.

13. The non-transitory computer-readable media of claim 9, wherein the policy probabilistic data structure is configured to cause the mobile device to transmit a packet, received by the mobile device, to a threat intelligence gateway based on a first attribute of the packet, and wherein the threat intelligence gateway interfaces a boundary between:
   a first network that is protected by the threat intelligence gateway and is associated with the mobile device, and
   a second network-.

14. The non-transitory computer-readable media of claim 9, wherein the instructions, when executed by the one or more processors, cause the computing device to receive the new plurality of packet filtering rules by causing the computing device to:
   receive an indication that one or more packets, received by the mobile device, were transmitted to a threat intelligence gateway that interfaces a boundary between:
      a first network that is protected by the threat intelligence gateway and is associated with the mobile device, and
      a second network.

15. The non-transitory computer-readable media of claim 9, wherein the policy probabilistic data structure is configured to cause logging of a packet based on a first attribute of the packet.

16. The non-transitory computer-readable media of claim 9, wherein the new policy probabilistic data structure comprises an updated version of the policy probabilistic data structure.

17. An apparatus comprising:
   one or more processors; and
   memory storing instructions that, when executed by the one or more processors, cause the apparatus to:
      receive a plurality of packet filtering rules, wherein the plurality of packet filtering rules were automatically created or altered based on malicious traffic information received from a plurality of cyber threat intelligence providers, and wherein at least two of the plurality of cyber threat intelligence providers are managed by different organizations;
      generate a policy probabilistic data structure that represents the plurality of packet filtering rules;
      send, to a mobile device, the policy probabilistic data structure, wherein the policy probabilistic data structure causes filtering of one or more packets received by the mobile device;
      receive, based on updated malicious traffic information received from one or more of the plurality of cyber threat intelligence providers, a new plurality of packet filtering rules;
      generate a new policy probabilistic data structure that represents the new plurality of packet filtering rules; and
      send, to the mobile device, the new policy probabilistic data structure.

18. The apparatus of claim 17, wherein the policy probabilistic data structure is a Bloom filter or a Cuckoo filter.

19. The apparatus of claim 17, wherein the new policy probabilistic data structure causes the mobile device to filter a packet having a first attribute, and wherein, prior to sending the new policy probabilistic data structure, the policy probabilistic data structure was configured to cause the mobile device to allow packets having the first attribute.

20. The apparatus of claim 17, wherein at least one of the new plurality of packet filtering rules indicates a rule action, and wherein the new policy probabilistic data structure is configured to cause the mobile device to perform the rule action on a received packet.

21. The apparatus of claim 17, wherein the policy probabilistic data structure is configured to cause the mobile device to transmit a packet, received by the mobile device, to a threat intelligence gateway based on a first attribute of the packet, and wherein the threat intelligence gateway interfaces a boundary between:
   a first network that is protected by the threat intelligence gateway and is associated with the mobile device, and
   a second network-.

22. The apparatus of claim 17, wherein the instructions, when executed by the one or more processors, cause the apparatus to receive the new plurality of packet filtering rules by causing the apparatus to:
   receive an indication that one or more packets, received by the mobile device, were transmitted to a threat intelligence gateway that interfaces a boundary between:
      a first network that is protected by the threat intelligence gateway and is associated with the mobile device, and
      a second network.

23. The apparatus of claim 17, wherein the policy probabilistic data structure is configured to cause logging of a packet based on a first attribute of the packet.

24. The apparatus of claim 17, wherein the new policy probabilistic data structure comprises an updated version of the policy probabilistic data structure.

* * * * *

UNITED STATES PATENT AND TRADEMARK OFFICE
CERTIFICATE OF CORRECTION

| | | |
|---|---|---|
| PATENT NO. | : 11,063,909 B1 | Page 1 of 1 |
| APPLICATION NO. | : 17/194886 | |
| DATED | : July 13, 2021 | |
| INVENTOR(S) | : Sean Moore et al. | |

It is certified that error appears in the above-identified patent and that said Letters Patent is hereby corrected as shown below:

On the Title Page

Item (22), please insert:
--¶ (65) Prior Publication Data US 2021/0211409 A1 Jul. 08, 2021--

In the Claims

Column 23, Claim 13, Line 19:
Please delete "network-." and insert --network.--

Column 24, Claim 21, Line 34:
Please delete "network-." and insert --network.--

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*